(12) United States Patent
McKenzie

(10) Patent No.: US 6,415,761 B1
(45) Date of Patent: Jul. 9, 2002

(54) ENGINE OVER TEMPERATURE PROTECTION

(75) Inventor: Ian Daniel McKenzie, Canton, MI (US)

(73) Assignee: Detroit Diesel Corporation, Detroit, MI (US)

(*) Notice: Subject to any disclaimer, the term of this patent is extended or adjusted under 35 U.S.C. 154(b) by 0 days.

(21) Appl. No.: 09/599,919

(22) Filed: Jun. 22, 2000

Related U.S. Application Data

(60) Provisional application No. 60/203,634, filed on May 11, 2000.

(51) Int. Cl.⁷ .................................. F02B 77/00
(52) U.S. Cl. ................. 123/198 D; 123/41.15; 123/335
(58) Field of Search ............ 123/198 D, 333, 123/335, 41.15

(56) References Cited

U.S. PATENT DOCUMENTS

| | | | |
|---|---|---|---|
| 4,459,951 A | * 7/1984 | Tobinaga et al. | 123/198 DC |
| 4,895,120 A | * 1/1990 | Tobinaga et al. | 123/417 |
| 5,070,832 A | 12/1991 | Hapka et al. | |
| 5,201,284 A | * 4/1993 | Umehara | 123/41.15 |
| 5,315,972 A | 5/1994 | Judy et al. | |
| 5,392,741 A | * 2/1995 | Uzkan | 123/41.13 |
| 5,540,204 A | 7/1996 | Schnaibel et al. | |
| 6,026,784 A | 2/2000 | Weisman et al. | |

* cited by examiner

Primary Examiner—Tony M. Argenbright
Assistant Examiner—Katrina B. Harris
(74) Attorney, Agent, or Firm—Brooks & Kushman P.C.

(57) ABSTRACT

A method of operating an engine during an over temperature condition to protect the engine, an information recording medium incorporating a computer program implementing this protection method, and an electronic control module that performs this protection method are disclosed. A torque value representative of an engine generated torque is recorded in response to an engine temperature exceeding a protection temperature threshold. The engine torque is then reduced as a nonlinear function of the temperature signal and the recorded torque value to promote engine cooling.

22 Claims, 4 Drawing Sheets

ENGINE OVER TEMPERATURE PROTECTION

CROSS-REFERENCE TO RELATED APPLICATIONS

This application claims the benefit of U.S. Propositional application Ser. No.60/203,634 filed May 11, 2000.

TECHNICAL FIELD

The present invention is related to the field of over temperature protection for internal combustion engines.

BACKGROUND ART

Most, if not all vehicles in production today utilize one or more microprocessors and other digital electronics to control the vehicle's engine, transmission, brakes, and a variety of other major systems. The microprocessors and other electronics are typically located in one or more housings commonly called electronic control modules (ECM). ECMs are versatile components that can change their behavior and the behavior of the items they are controlling by changing software programs executed by the ECMs. Programmability allows a single ECM design to be adapted to many different types of engines, or transmissions, or braking systems, and so on. Variations in programming allow two otherwise identical systems to exhibit different behavior. For example, two identical engines may have different torque ratings at a given engine RPM due to differences in calibration tables programmed into the ECMs.

Engine protection is an important function often programmed into ECMs. Of particular interest are over temperature conditions during which the engine temperature reaches levels that could be damaging or destructive. Here, the ECM must take some action to increase the cooling rate for the engine and/or decrease the rate at which the engine generates heat. Problems can arise when an increase in the cooling rate takes a considerable time to be effective. The engine temperature may exceed a critical level before the additional cooling can bring the temperature down. On the other hand, decreasing the heat generation rate of the engine may be performed quickly, but it may be contrary to the wishes of the vehicle's operator.

One method of engine over temperature protection is disclosed U.S. Pat. No. 5,070,832 issued to Hapka et al. on Dec. 10, 1991. Hapka et al. discloses a method that monitors several fluid parameters associated with the engine looking for fault conditions. Typical faults include high fluid temperatures, low fluid levels and low fluid pressures. When fluid parameter faults are detected, an ECM derates the torque and/or speed of the engine based upon the severity and type of faults detected. Performance derating increases linearly as the fluid parameters move farther out of their normal operating ranges. Filtering provides isolation from short fault transients in the fluid parameters that are not severe enough to require engine protection. The Hapka et al. approach is most effective when the engine is operating near or at its rated performance. Here, a slight derating will most likely require the ECM to lower the engine's actual performance. Performance derating effectiveness drops in scenarios where the engine is operating well below its ratings. In these cases, the derated performance may still be above the engine's actual performance and thus the ECM is not required to change engines' operations.

Another engine over temperature protection approach is to reduce the torque controlling signal or signals being used to control the engine. In this approach, the ECM records the values of the torque controlling signals at the beginning of an over temperature condition. These signals are then reduced as a linear function of temperature to cause the torque and heat being generated by the engine to reduce. In this approach, the ECM will always take some action that will promote the lowering of the engine's temperature.

A consequence of both engine protection approaches is that the vehicle's driver may become aware of the protective action due to a reduction in the vehicle's speed and/or the illumination of a notification lamp. When this happens, the driver may attempt to compensate by increasing the throttle input manually. This usually does not have the desired effect since the ECM is executing the engine protection routine. As a result, the driver typically concludes that the engine has somehow failed. While an engine failure is one possible explanation for the over temperature condition, another explanation is that the engine is being operated outside its designed operating environment. For example, an engine over temperature condition may be caused by the vehicle moving up a steep grade high in the mountains carrying a heavy load on an unusually hot day. In this example, there may not be sufficient air flow past the radiator to cool the engine adequately.

DISCLOSURE OF INVENTION

The present invention is method of operation to protect an engine during an over temperature condition, an information recording medium including a computer program implementing the method, and an electronic control module performing the method. Onset of the protection is made gradual to minimize the impact of the protection on overall engine performance. The rate of protection then increases if the engine temperature continues to increase.

An operating torque signal representative of a torque being generated by the engine is recorded to produce a recorded torque value in response to a temperature signal representative of a temperature of the engine exceeding a protection temperature threshold. The torque being generated by the engine is then reduced as a nonlinear function of the temperature signal and the recorded torque value to promote lowering of the temperature of the engine. A notification indicator and a warning indicator are activated if the engine temperature exceeds a notification temperature threshold and a warning temperature threshold respectively. The torque reduction may be limited to no less than a fixed percentage of the recorded torque value, or to no less than a minimum absolute torque value, whichever is greater.

Diagnostic fault logging may be provided to log the engine temperature exceeding the protection, notification and warning temperature thresholds. Fault broadcasting may also be provided to notify other control modules and systems that the engine temperature has exceeded the notification and then the warning temperature thresholds.

Accordingly, it is an object of the present invention to provide a method and apparatus for protecting and engine during an over temperature condition implementing a nonlinear response to the engine temperature.

These and other objects, features and advantages will be readily apparent upon consideration of the following detailed description in conjunction with the accompanying drawings.

BEST MODE FOR CARRYING OUT THE INVENTION

Figure 1:
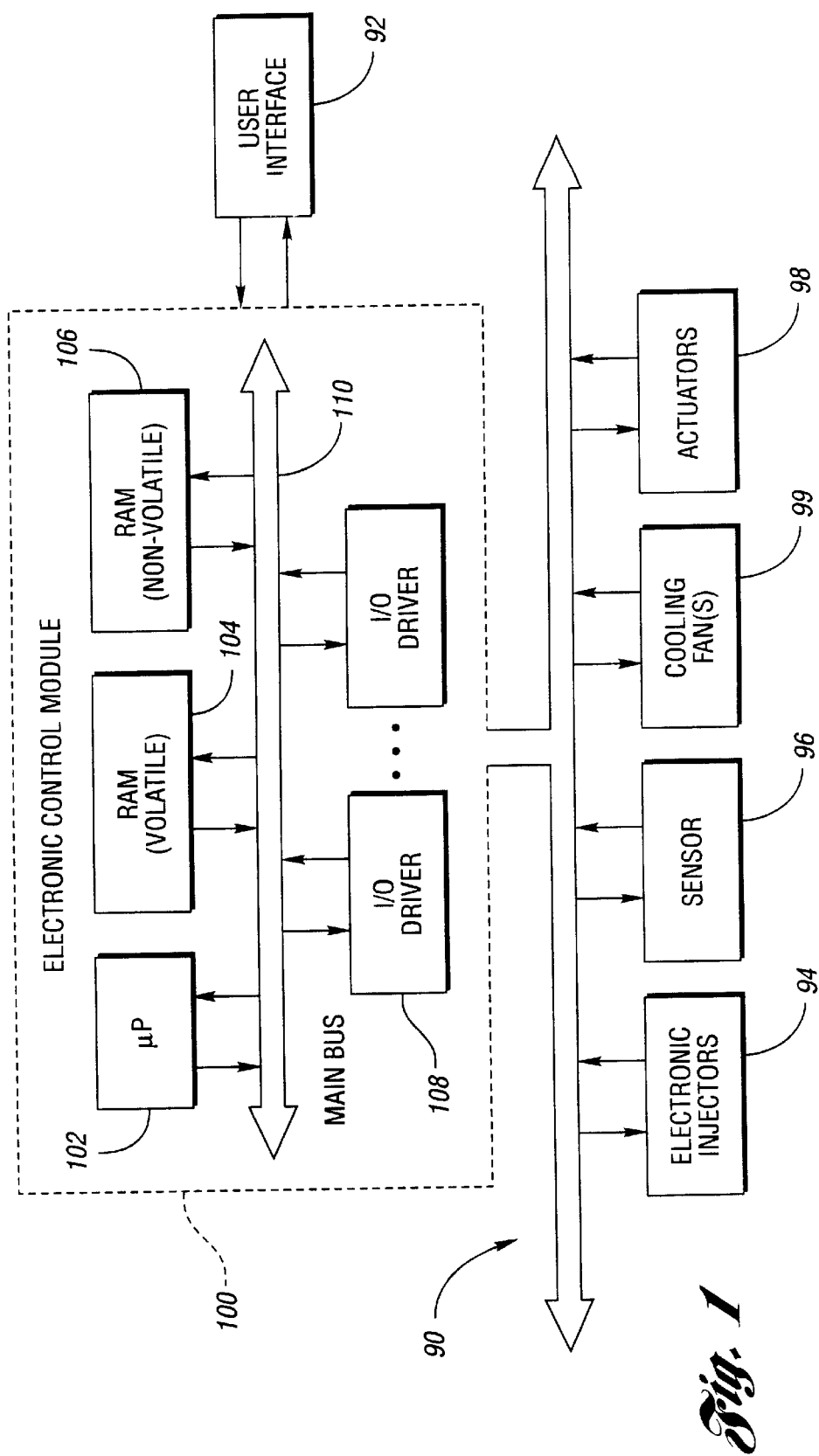
FIG. 1 is a component block diagram of an electronic control module.

FIG. 1 shows an electronic control module (ECM) 100 in communication with typical engine componentry, shown generally to be reference numeral 90, and a user-interface 92. As shown, the ECM 100 includes a microprocessor 102 having volatile random access memory (RAM) 104 and nonvolatile read-only memory (ROM) 106. Of course, the ECM may contain other types of memory instead of, or in addition to RAM 104 and ROM 106, such as flash EPROM and EEPROM memories, as is well known in the art.

The ROM 106, or other nonvolatile memory, may contain instructions that are executed to perform various control and information functions, and data tables that contain calibration values and parameters characterizing normal engine operation. Microprocessor 102 imparts control signals to, and receives signals from input and output (I/O) drivers 108. The I/O drivers 108 are in communication with the engine componentry 90 and serve to protect the ECM 100 from hostile electrical impulses while providing the signals and power necessary for engine control according to the present invention. The ECM 100 componentry detailed above is interconnected by data, address and control busses 110. It should be noted that there are a variety of other possible control schemes that include various combinations of microprocessors and electric and electronic circuits that could perform the same functions.

Engine componentry 90 includes a plurality of electronic unit injectors (EUI) 94, each associated with a particular engine cylinder (not shown); and a plurality of sensors 96 for indicating various engine operating conditions. Examples of these conditions include, but are not limited to coolant temperature, ambient air temperature, intake manifold air temperature, inlet air temperature, engine oil temperature, fuel temperature, intercooler temperature, throttle position, intake manifold pressure, fuel pressure, oil pressure, coolant pressure, cylinder position, and cylinder sequencing. Engine componentry 90 also includes actuators 98 that may include solenoids, variable valves, indicator lights, motors and generators. It should be appreciated that the ECM 100 may also be in communication with other vehicle componentry 90, such as cooling fans 99, and other microprocessors (not shown) that control associated vehicle systems such as brakes, transmission, a vehicle management system and a fleet management radio transponder.

User-interface 92, also known as a data hub, is used to store user-selected monitoring parameters and associated values for those parameters, to determine service intervals and to perform trend analysis. The user selected parameters may include adjustable limits, such as desired engine oil life. Engine historical information may include diagnostic information used to assist personnel performing routine maintenance or troubleshoot malfunctions, as well as engine and vehicle operation data that may be analyzed to evaluate vehicle operator performance in addition to vehicle performance. It should be appreciated that although FIG. 1 illustrates the user-interface as external to the ECM 100, certain operations performed by the user-interface 92 could also be performed by the ECM 100.

Figure 2:
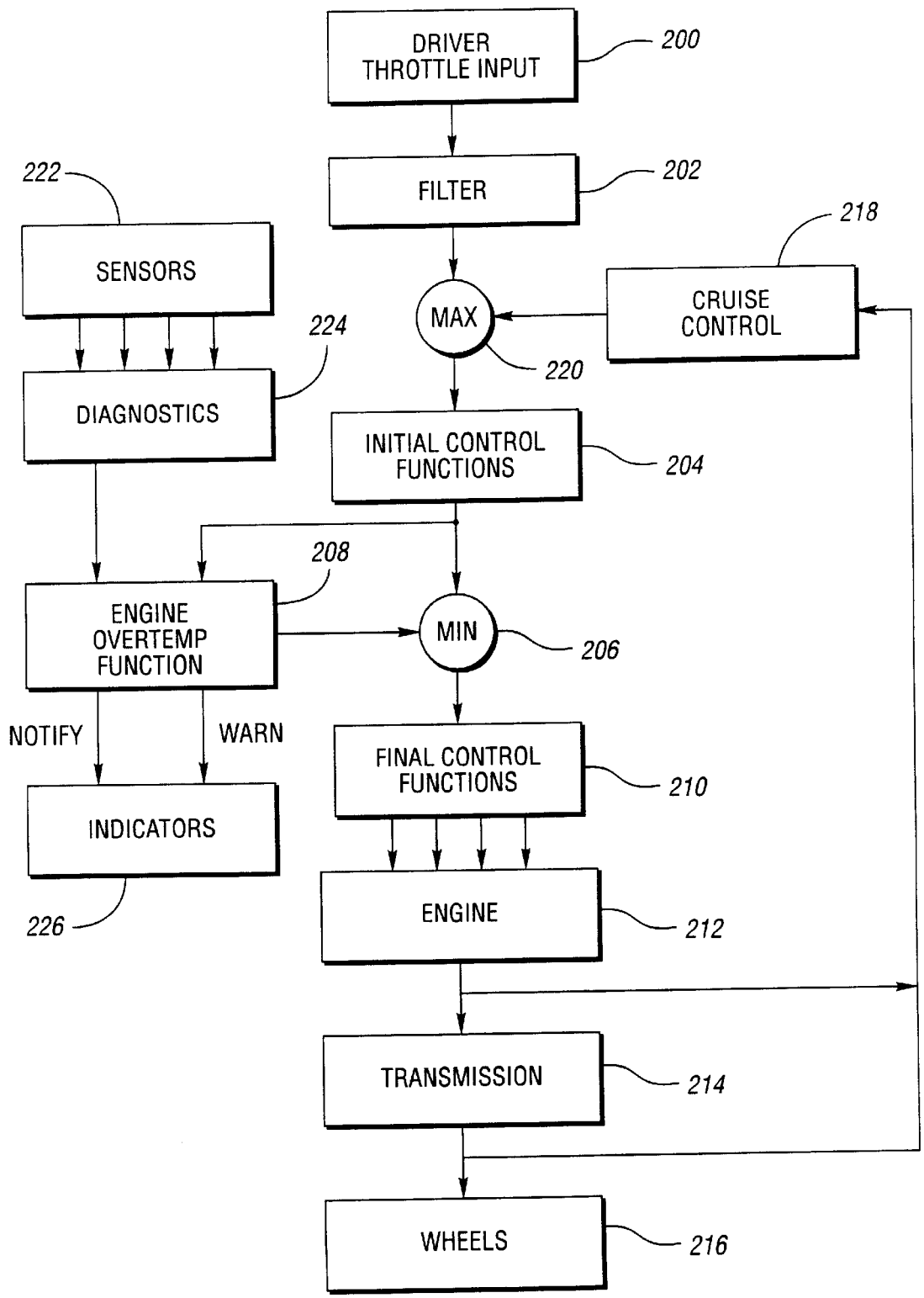
FIG. 2 is a functional flow diagram showing the electronic control module implementing over temperature protection.

A functional block diagram showing the electronic control module implementing over temperature protection is shown in FIG. 2. A driver's throttle position signal is entered by the driver through a throttle position sensor, as shown in block 200. The throttle input signal is then filtered, as shown in block 202, to produce a requested torque signal. Initial control functions are applied to the requested torque signal, as shown in block 204, to produce an intermediate torque signal. One example of an initial control function is a torque governing function that restricts the requested torque signal between minimum and maximum torque limits. The governing function prevents the engine from stalling at low speeds and from damaging itself or other systems at high torque loads. Another example of an initial control function is an emissions control function. Here, the requested torque signal is controlled to limit emissions produced by the engine as the engine is warning up. It will be understood by those skilled in the art that other types of initial control functions may be implemented within the scope of the present invention.

In block 206, the intermediate torque signal is compared with a protection torque signal and the smaller of the two signals is output as a final torque signal. The protection torque signal is generated by the ECM as part of the over temperature protection function 208 of the present invention and will be discussed in detail below. The final torque signal is input into final control functions, as shown in block 210, to produce various signals applied to the engine. Examples of final control functions include, but are not limited to fuel temperature compensation, air/fuel ratio control, and electronic unit injector control. These control functions determine the amount of air and fuel to be entered into the engine, spark generation (if applicable), actuator energization, and associated timing to control actual operation of the engine, and in particular the torque generated by the engine.

The engine functions to convert air and fuel into rotational motion having a rotational speed and torque, as shown in block 212. Any type of internal combustion engine may be used within the scope of the present invention. For example, the engine may operate on a four-stroke or a two-stroke cycle, utilize spark gap or diesel ignition of the air/fuel mixture, operate at a variable or fixed speed, and operate at a variable or fixed loading. A transmission functions to convert the rotational motion received from the engine into useful ranges of rotational speed and torque as required by the particular application, as shown in block 214. In the case of a vehicle, an output of the transmission is applied to wheels to convert the rotational motion into linear movement of the vehicle, as shown in block 216. It will be appreciated that in other applications the wheels may be another type of load such as an electrical generator, a pump, or the like.

A cruise control function, as shown by block 218, may be included to provide feedback for automated speed control. Input to the cruise control function may be either the engine speed as determined from an output drive shaft of the engine, or a vehicle speed as determined from the wheel speed. The cruise control function operates to convert the measured speed into a second requested torque signal. The second requested torque signal is then compared with the requested torque signal output from the filter function, and the larger of the two signals is provided to the initial control functions, as shown in block 220.

An engine over temperature condition is detected by the ECM 100 based upon information received from the sensors 96. The sensors 96 measure various parameters associated with the engine, as shown in block 222. In the preferred embodiment, the sensors 96 measure a coolant level, a coolant temperature, an oil pressure and an oil temperature. Additional parameters that could be monitored include, but are not limited to, a coolant pressure, a crankcase pressure, an intercooler temperature, an intercooler pressure and various auxiliary inputs. Signals from the sensor 96 are provided to the ECM 100 where a temperature of the engine is determined. A diagnostic function, block 224, uses this information to determine if and when over temperature protection of the engine is required, as shown in block 224. Output from the diagnostic function includes a temperature signal that represents the engine's temperature.

The protection torque signal is generated by the engine over temperature function, as shown in block 208, when the diagnostic function determines that over temperature protection for the engine is required. In the preferred embodiment, the protection torque signal is a percentage of the intermediate torque signal sampled at the moment in time that the over temperature condition begins, or at a historical time captured in a filter. As described above, the protection torque signal is compared with the intermediate torque signal in block 206 and the smaller of the two signals is used as the final torque signal. In this way, the driver cannot command the engine to produce a higher torque, possibly resulting in a higher engine temperature. On the other hand, the driver may enter a requested torque lower than the protection torque. Here, the driver's lower requested torque will be accepted and used for the final torque signal, resulting in a lower engine temperature.

The engine over temperature function records the intermediate torque signal as a recorded torque value when the engine temperature exceeds a protection temperature threshold. Here, the intermediate torque signal is treated as an operating torque signal representative of the torque being generated by the engine. It should be noted that other signals available to the ECM 100 may be used as the operating torque signal. For example, the operating torque signal may be sampled prior to the initial control functions 204. In this example, the minimum selection function of block 206 would take place prior to the initial control function 204, and would select the smaller of the requested torque signal and the protection torque signal. Likewise, the sampling of the operating torque signal may take place at some intermediate point within the final control functions 210. In still another example, if the cruise control function 218 is utilized at all times, then the operating torque signal may be sampled from within the cruise control function 218, or from the second requested torque signal at the output of the cruise control function 218. Those skilled in the art will appreciate that the exact location or locations where the operating torque signal is recorded from may be varied in different control schemes within the scope of the present invention.

Figure 3:
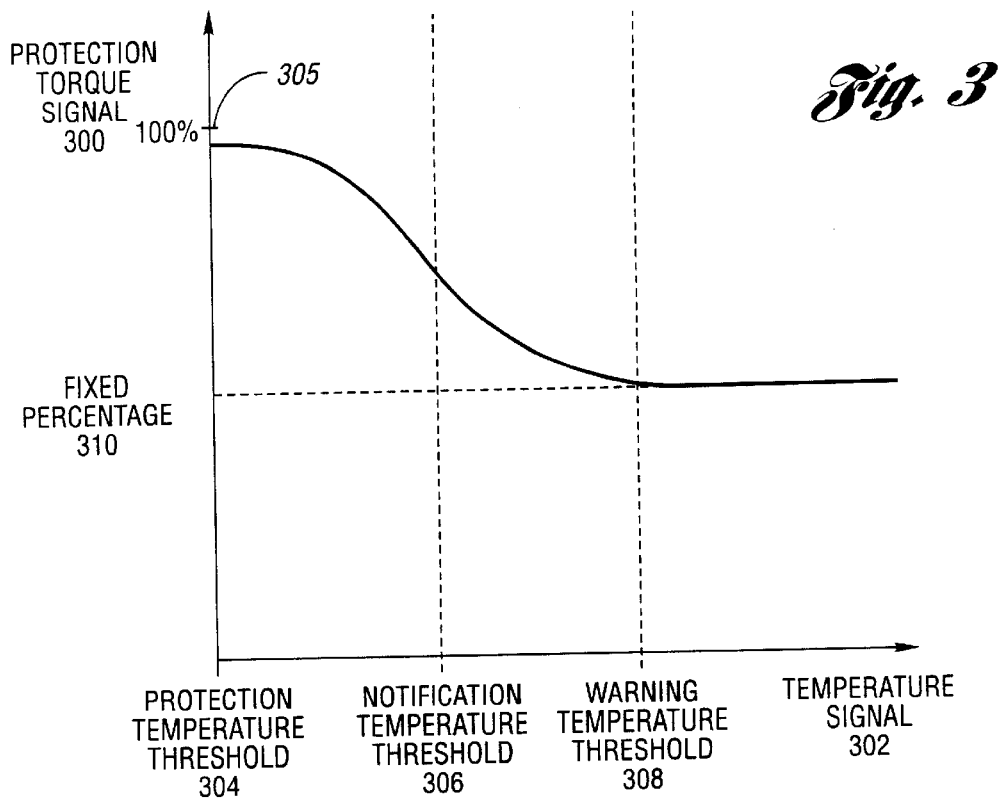
FIG. 3 is a graph of an operating torque signal reduced as a function of temperature during the over temperature condition.

As the temperature signal increases above the protection temperature threshold, then the protection torque signal is reduced as a nonlinear function of the temperature signal and the recorded torque value. Different nonlinear functions of the protection torque signal 300 are graphed as a function of the temperature signal 302 in FIGS. 3, 4 and 5. Referring to FIG. 3, over temperature protection begins when the temperature signal 302 exceeds a protection temperature threshold 304. Above the protection temperature threshold 304, the protection torque signal 300 is slightly less than 100% of the recorded torque value (shown at point 305.) As the temperature signal 302 increases, the protection torque signal 300 is reduced in a nonlinear fashion. The initial rate of reducing the protection torque signal is designed to be slow at the onset of reduction. This is done to minimize the impact of the engine torque reduction on the vehicle while still encouraging an engine temperature reduction. Another benefit of a gradual initial reduction rate is that there is no need to filter transients in the temperature signal, although filtering may be done. A momentary rise in the engine temperature, or noise in one of the sensor signals can trigger over temperature protection without having a major impact of overall engine performance. There is no filtering delay to the start of the over temperature protection.

If the initial over temperature protection does not lower the engine temperature, then the rate of protection torque signal reduction is increased as the temperature signal 302 increases to promote even greater cooling of the engine. When the temperature signal 302 exceeds a notification temperature threshold 306, then the ECM 100 notifies the driver that the over temperature protection is already in progress. Returning to FIG. 2, notification is performed by activating a notification indicator visible to the driver, as shown in block 226. This notification indicator is commonly known as a "Check Engine Lamp". Notification may also be in the form of an audio signal, such as a tone or voice message.

Referring again to FIG. 3, protection torque signal reduction continues if the temperature signal 302 continues to increase above the notification temperature threshold. When the temperature signal 302 exceeds a warning temperature threshold 308, then the ECM activates a warning to the driver. As with the notification, the warning is typically in the form of a lamp, commonly called a "Stop Engine Lamp". Illumination of this lamp informs the driver that some action must be taken to avoid damage or destruction of the engine. A choice of manual action, automatic action or a combination of both may be incorporated within the present invention. The meaningful event is that the over temperature protection function may not take any additional action above the warning temperature threshold 308. In the preferred embodiment, protection torque signal reduction is limited at a fixed percentage 310 of the recorded torque value. This approach allows the engine to continue to rotate while decisions are made elsewhere to stop the engine or continue operation at the probable cost of engine damage or destruction.

Figure 4:
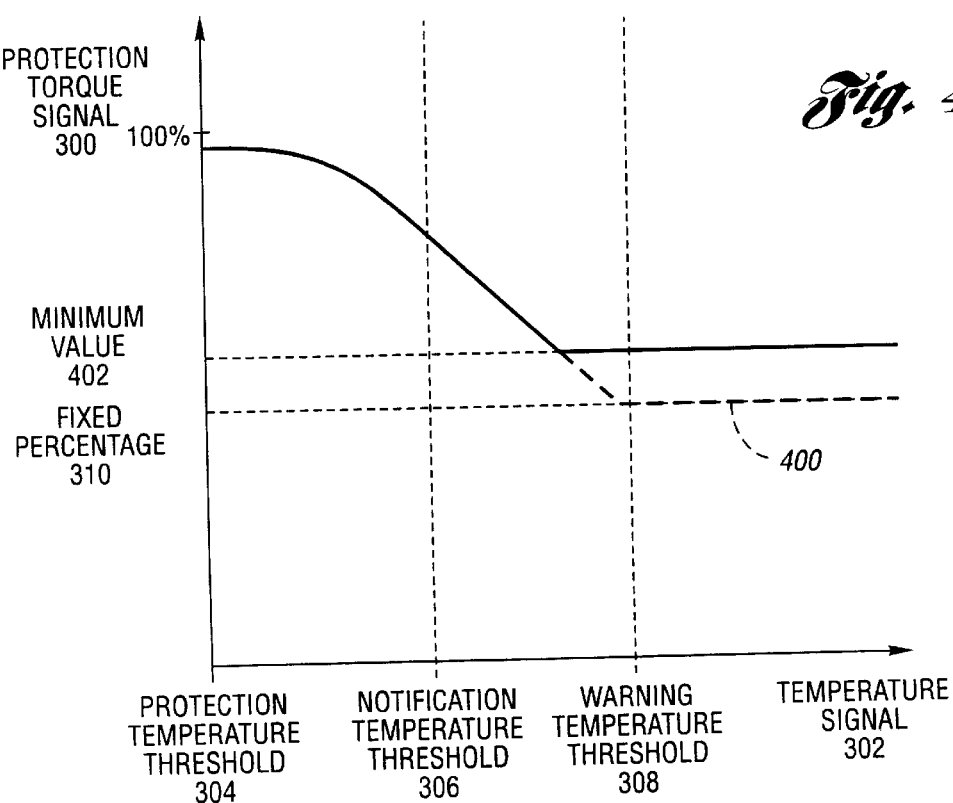
FIG. 4 is a graph of an operating torque signal reduced as a second function of temperature and limited at a minimum torque value.

FIG. 4 shows another nonlinear curve of the protection torque signal 300 as a function of temperature signal 302. In this curve, the rate of protection torque signal reduction is a constant at temperatures between the notification temperature threshold and the warning temperature threshold. This curve also illustrates a condition where the operating torque was relatively low when the over temperature condition began. In this example, if the protection torque signal 300 were allowed to follow its calibration curve, then the torque being generated by the engine would fall below a minimum torque level, as shown by the phantom portion 400 of the curve. Instead, the ECM 100 may be programmed to limit the protection torque signal 300 to no less than a minimum value 402 that corresponds to the minimum absolute torque that the engine should produce to maintain rotation. Note that this limiting may take place while the temperature signal 302 is below the warning temperature threshold 308 (as shown) or even below the notification temperature threshold 306.

Figure 5:
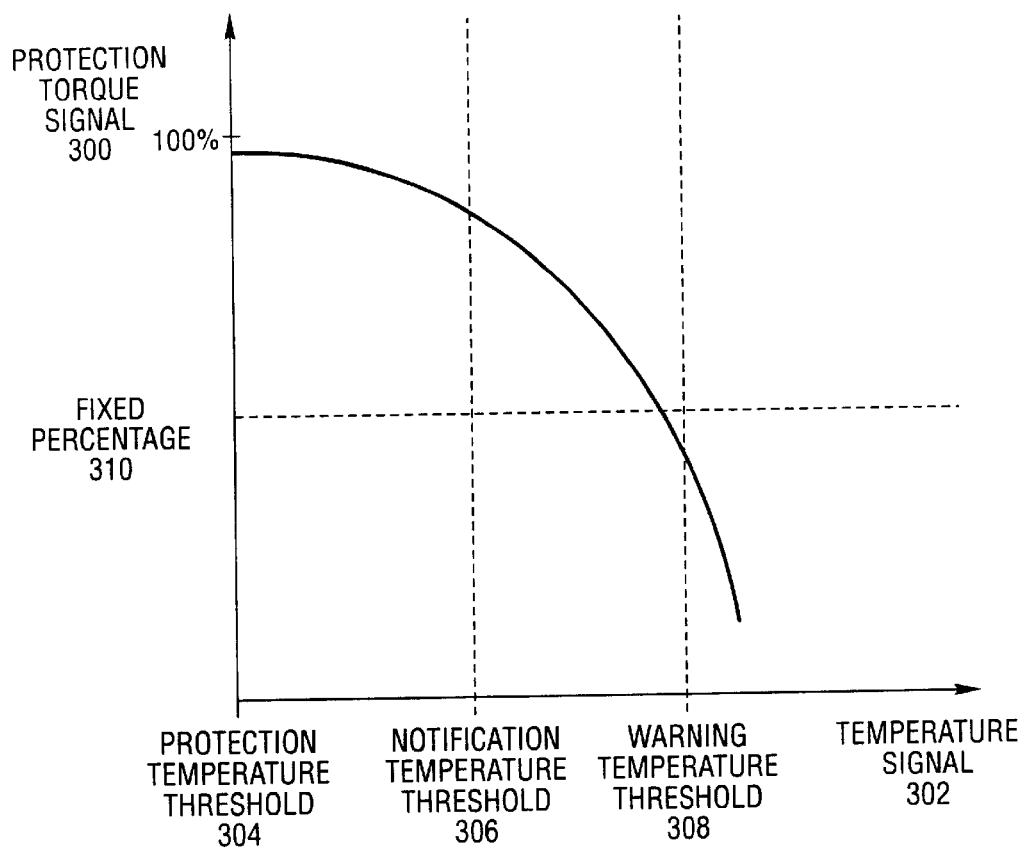
FIG. 5 is a graph of the operating torque signal reduced as a third function of temperature.

FIG. 5 shows yet another nonlinear curve where the protection torque signal rate of reduction continues to increase as a function of the temperature signal 302. This curve represents applications in which engine over temperature protection is very important so an ever-increasing cooling is applied as the engine temperature gets hotter and hotter. In an extreme case, this approach would be allowed to stall the engine to avoid damage.

In practice, the protection torque signal curve is programmed into the ECM 100 through the user interface 92 as a series of discrete calibration points. The ECM 100 interpolates between these discrete points to determine the protection torque signal at intermediate engine temperatures. Table 1 is an example of discrete points used in implementing the present invention in the preferred embodiment.

TABLE 1

Torque Reduction Calibration Points

| Engine Temperature (° F.) | Torque Reduction (Percent) |
| --- | --- |
| 212 | 99 |
| 214 | 98 |
| 216 | 92 |
| 218 | 82 |
| 220 | 72 |
| 222 | 62 |
| 224 | 58 |
| 226 | 52 |
| 228 | 46 |

In the preferred embodiment, the notification temperature threshold is approximately 221° F. and the warning temperature threshold is approximately 227° F.

As mentioned earlier, the ECM 100 is able to log and report diagnostic information. An over temperature condition includes several important events that may be logged and reported. The first event that may be logfed is the triggering of the over temperature function above the protection temperature threshold 304. Although the onset of over temperature protection may be gradual, and the driver may not be informed of minor over temperature conditions, the event should still be logged to provides historical data to maintenance personnel looking for trends in engine performance.

Temperature signal 302 exceeding the notification temperature threshold 306 is another event that should be logged. In this case, the driver is aware that the over temperature protection function has been invoked because the notification indicator has been activated. An electronic record of the event should be recorded to support the driver's witnessing of the active notification indicator. If the ECM 100 is in communications with other control modules within the vehicle, this notification temperature threshold 306 event may also be broadcast to the other control modules for their use and benefit. For example, in a commercial truck application, an automatic status report generator may use knowledge of the notification temperature threshold 306 event to automatically update and transmit a vehicle health status report via a radio installed in the truck. This report informs the trucking company management that this particular vehicle is experiencing problems and should be schedule for maintenance in the near future.

A third event that should be logged is the engine temperature exceeding the warning temperature threshold 308. In this scenario, it is possible that the engine has sustained some damage and should be inspected as soon as possible. The ECM 100 should also broadcast this event to other control modules and systems that can take action based upon this information. For example, in a military vehicle application where the engine is allowed to overheat to the point of self-destruction, an intelligent electrical power control system may use this information to switch off non-essential equipment to reduce alternator loading on the engine.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for protecting an engine during an over temperature condition, the method comprising:

recording an operating torque signal representative of a torque being generated by the engine to produce a recorded torque value in response to a temperature signal representative of a temperature of the engine exceeding a protection temperature threshold; and reducing the torque being generated by the engine as a nonlinear function of the temperature signal and the recorded torque value to promote lowering of the temperature of the engine.

2. The method of claim 1 further comprising limiting the reduction of the torque to no less than a minimum torque.

3. An information recording medium for use in a control module that controls an engine, the information recording medium recording a computer program that is readable and executable by the control module, the computer program comprising:

recording an operating torque signal representative of a torque being generated by the engine to produce a recorded torque value in response to a temperature signal representative of a temperature of the engine exceeding a protection temperature threshold;

reducing the torque being generated by the engine as a nonlinear function of the temperature signal and the recorded torque value to promote lowering of the temperature of the engine; and activating a notification indicator in response to the temperature signal exceeding a notification temperature threshold, the notification temperature threshold being above the protection temperature threshold.

4. The information recording medium of claim 3 wherein the computer program further comprises increasing a rate at which the torque is reduced as the temperature signal increases above the protection temperature threshold to provide a gradual onset to reducing the torque.

5. The information recording medium of claim 3 wherein the computer program further comprises limiting the reduction of the torque to no less than a minimum torque.

6. The information recording medium of claim 3 wherein the computer program further comprises activating a notification indicator in response to the temperature signal exceeding a notification temperature threshold, the notification temperature threshold being above the protection temperature threshold.

7. A control module for controlling an engine, the control module comprising:

a temperature input for receiving a temperature signal representative of a temperature of the engine;

a torque input for receiving an operating torque signal representative of a torque being generated by the engine; and a processor connected to the temperature input, the torque input and the engine, the processor being operational to control the torque being generated by the engine based upon the operating torque signal, to record the operating torque signal as a recorded torque value when the temperature signal exceeds a protection temperature threshold, and to reduce the torque being generated by the engine as a nonlinear function of the temperature signal and the recorded torque value to promote lowering of the temperature of the engine.

8. The control module of claim 7 further comprising the processor being operative to increase a rate at which the torque is reduced as the temperature signal increases above the protection temperature threshold to provide a gradual onset to reducing the torque.

9. The control module of claim 7 further comprising the processor being operative to limit the reduction of the torque to no less than a minimum torque.

10. The control module of claim 7 further comprising the processor being operative to activate a notification indicator in response to the temperature signal exceeding a notification temperature threshold, the notification temperature threshold being above the protection temperature threshold.

11. A method for controlling an engine to lower the temperature of the engine during an over temperature condition, the method comprising:
    determining the engine temperature from at least one input representative of the engine temperature;
    comparing the determined engine temperature with a protection temperature threshold; and
    when the determined engine temperature exceeds the protection temperature threshold, recording an operating torque signal representative of a torque being generated by the engine to produce a recorded torque value, and reducing the torque being generated by the engine as a nonlinear function of the temperature signal and the recorded torque value,
    wherein the rate at which the torque is reduced is increased as the determined engine temperature increases above the protection temperature threshold to provide a gradual onset to reducing the torque.

12. The method of claim 11 further comprising limiting the reduction of the torque to no less than a minimum torque.

13. The method of claim 12 further comprising limiting the reduction of the torque to no less than a minimum torque.

14. The method of claim 11 further comprising activating a notification indicator when the determined engine temperature exceeds a notification temperature threshold.

15. The method of claim 21 where the notification temperature threshold is above the protection temperature threshold.

16. A method for controlling an engine to lower the temperature of the engine during an over temperature condition, the method comprising:
    determining the engine temperature from at least one input representative of the engine temperature;
    comparing the determined engine temperature with a protection temperature threshold;
    when the determined engine temperature exceeds the protection temperature threshold, recording an operating torque signal representative of a torque being generated by the engine to produce a recorded torque value, and reducing the torque being generated by the engine as a nonlinear function of the temperature signal and the recorded torque value;
    comparing the determined engine temperature with a warning temperature threshold; and
    when the determined engine temperature exceeds a warning temperature threshold, reducing the torque by a fixed percentage of the recorded torque value in lieu of the nonlinear function.

17. The method of claim 16 where the warning temperature threshold is above the protection temperature threshold.

18. The method of claim 16 further comprising activating a notification indicator when the determined engine temperature exceeds a notification temperature threshold.

19. A method for controlling an engine to lower the temperature of the engine during an over temperature condition, the method comprising:
    determining the engine temperature from at least one input representative of the engine temperature;
    comparing the determined engine temperature with a protection temperature threshold;
    when the determined engine temperature exceeds the protection temperature threshold, recording an operating torque signal representative of a torque being generated by the engine to produce a recorded torque value, and reducing the torque being generated by the engine as a nonlinear function of the temperature signal and the recorded torque value;
    comparing the determined engine temperature with a notification temperature threshold which is above the protection temperature threshold; and
    activating a notification indicator when the determined engine temperature exceeds a notification temperature threshold.

20. The method of claim 19 further comprising limiting the reduction of the torque to no less than a minimum torque.

21. An information recording medium for use in a control module that controls an engine, the information recording medium recording a computer program that is readable and executable by the control module, the computer program comprising:
    recording an operating torque signal representative of a torque being generated by the engine to produce a recorded torque value in response to a temperature signal representative of a temperature of the engine exceeding a protection temperature threshold;
    reducing the torque being generated by the engine as a nonlinear function of the temperature signal and the recorded torque value to promote lowering of the temperature of the engine;
    activating a notification indicator in response to the temperature signal exceeding a notification temperature threshold, the notification temperature threshold being above the protection temperature threshold; and
    reducing the torque by a fixed percentage of the recorded torque value in lieu of the nonlinear function in response to the temperature signal exceeding a warning temperature threshold, the warning temperature threshold being above the protection temperature threshold.

22. A control module for controlling an engine, the control module comprising:
    a temperature input for receiving a temperature signal representative of a temperature of the engine;
    a torque input for receiving an operating torque signal representative of a torque being generated by the engine;
    a processor connected to the temperature input, the torque input and the engine, the processor being operational to control the torque being generated by the engine based upon the operating torque signal, to record the operating torque signal as a recorded torque value when the temperature signal exceeds a protection temperature threshold, and to reduce the torque being generated by the engine as a nonlinear function of the temperature signal and the recorded torque value to promote lowering of the temperature of the engine; and the processor being operative to reduce the torque by a fixed percentage of the recorded torque value in lieu of the nonlinear function in response to the temperature signal exceeding a warning temperature threshold, the warning temperature threshold being above the protection temperature threshold.

* * * * *

UNITED STATES PATENT AND TRADEMARK OFFICE
CERTIFICATE OF CORRECTION

PATENT NO.      : 6,415,761 B1
DATED           : July 9, 2002
INVENTOR(S)     : Ian Daniel McKenzie It is certified that error appears in the above-identified patent and that said Letters Patent is hereby corrected as shown below:

<u>Column 9,</u>
Line 46, delete "21" and insert -- 14 --.

Signed and Sealed this

Fifteenth Day of April, 2003

JAMES E. ROGAN
*Director of the United States Patent and Trademark Office*